United States Patent
Schaffer et al.

(10) Patent No.: US 6,716,794 B2
(45) Date of Patent: Apr. 6, 2004

(54) UTILIZATION OF PORPHYRIN DERIVATIVES IN AQUARIA

(75) Inventors: Moshe Schaffer, Munich (DE); Alexander Holtz, Munich (DE); Giulio Jori, Padua (IT); Michelangelo Marullo, Favaro Veneto-Venezia (IT)

(73) Assignee: DPC d.o.o., Koper (SI)

( * ) Notice: Subject to any disclaimer, the term of this patent is extended or adjusted under 35 U.S.C. 154(b) by 0 days.

(21) Appl. No.: 09/949,383

(22) Filed: Sep. 7, 2001

(65) Prior Publication Data
US 2002/0103246 A1 Aug. 1, 2002

(51) Int. Cl.[7] .................... A01N 43/34; A01N 43/36; A01N 43/00; A01N 43/38; A61K 31/40

(52) U.S. Cl. ................ 504/155; 504/156; 514/183; 514/408; 514/410; 514/411; 514/412

(58) Field of Search ................. 504/155, 156; 514/183, 408, 410, 411, 412

(56) References Cited

FOREIGN PATENT DOCUMENTS

| EP | 0 891 977 | 1/1999 |
|---|---|---|
| WO | WO 96/05862 | 2/1996 |
| WO | WO 97/29636 | 8/1997 |

*Primary Examiner*—Alton N. Pryor
(74) *Attorney, Agent, or Firm*—Kagan Binder PLLC

(57) ABSTRACT

The invention relates to the utilization of photosensitizers for controlling algae and bacteria in aquaria, whereby compounds of the tetrapyrrol and tetraazopyrrol families having at least one positive charge are used as sensitizers.

16 Claims, No Drawings

UTILIZATION OF PORPHYRIN DERIVATIVES IN AQUARIA

The present invention relates to the use of porphyrin derivatives for containing algae growth and controlling bacterial germs in aquaria.

Due to the growing demand for clean water at a time when its availability from natural sources is stagnant or decreasing, the development of methods for water processing has become increasingly important in the past decades. Numerous processes are already known aimed for example at eliminating bacterial contamination of water. Strong oxidizing agents such as hypohalogenites or permanganate are frequently used in the supply of potable water. Apart from these processes, methods such as the treatment of water with ozone or UV-radiation, which are aimed at preventing the water quality from being affected by added chemicals, are becoming increasingly significant.

However, such processes, which most of the time can only be carried out at a large scale and considerable technical expense, can generally not do justice to the requirements in the field of aquaria, where special demands to the applied water processing methods have to be met. While in conventional methods which are applied to free the treated water as completely as possible from microorganisms present therein there is the possibility of reprocessing the water prior to supplying it to the consumer, application in an aquarium requires a substance that can be used continuously and in situ without affecting the fauna and flora. In general, filtration systems are used to purify the aquarium water, wherein the filters mainly remove particulate impurities from the water (mechanical filtration). Additionally, chemical filters in the form of ion exchangers are often employed for controlling the ionic composition of the water. However, even the use of further chemically effective filtering substances such as for example activated carbon cannot always effectively prevent the occurrence and propagation of bacterial contaminants.

Controlling the water quality in an aquarium allows to prevent algae growth on the one hand and the occurrence of diseases in fish on the other hand. In particular in the case of bacterial diseases in fish, it is desirable to have an effective means at hand to counteract the spread of pathogens early on since sensitive fish species do not always respond successfully to medical treatments. The presence of numerous bacterial pathogens in water has been verified, including gram-positive rod-shaped and coccal bacteria, aeromonads, mycobacteria, gram-negative rod-shaped bacteria, vibrios and pseudomonads. The purposeful use of antibiotics against such bacteria cannot be initiated until first symptoms of the disease appear and additionally requires an exact identification of the pathogen. At that point, a propagation of the disease can no longer be prevented effectively.

Document DE-A-196 06 081 describes an application in a related field, namely the treatment of water in fish breeding plants wherein photosensitizers are used for disinfecting the water. However, contact of the fish with the sensitizers is prevented at great expense; the water is moved to a separate container for sterilization, irradiated and subsequently led back into the fish basins.

The object underlying the present invention is therefore the provision of an agent for controlling algae and bacterial germs in aquaria without the need for additional devices.

According to the present invention, this object is achieved by introducing at least one photosensitizer of the tetrapyrrol and/or tetraazopyrrol families having at least one positive charge into the water and subjecting it to electromagnetic radiation, preferably light. Although they are for example also known as stomach poisons for insects, the mentioned compounds can be added directly to the water in the aquarium without affecting the fish or the plants therein.

Due to their ability of catalyzing the formation of excited molecules upon irradiation, the use of such photosensitizers in the aquarium water can advantageously prevent the spread of monocellular or multicellular algae or bacteria in the aquarium.

Both gram-positive and gram-negative bacteria can successfully be controlled by the use of the sensitizers according to the present invention. In particular, however, compared to alternative processes, the method of the present invention offers the advantage that gram-negative bacteria, which are resistant to numerous other chemicals, can very effectively be controlled with the photosensitizers.

The term "photosensitizers" in the present invention denotes compounds which absorb electromagnetic radiation, preferably visible light, and are able to catalyze the formation of radicals and/or singlet oxygen from triplet oxygen under the influence of radiation. Tetrapyrrol and/or tetraazopyrrol compounds having at least one positively charged substituent (cationic photosensitizers) are suitable for use in the present invention. The type of substituent at the macrocyle is of secondary importance for the photochemical properties of the photosensitizers; they essentially influence their solubility properties. Thus, by purposefully introducing certain substituents, the desired solubility properties can be imparted to the photosensitizers while retaining the photochemical properties of the starting compound. A number of commercially available compounds suitable for this purpose are already at the disposal of the person skilled in the art.

When a photosensitizer of the above type is irradiated, preferably with light, it unfolds its antibacterial effect via the activation of oxygen and/or the promotion of processes involving radicals. Preferably, the radiation has a spectrum in the range of about 350 to 900 nm.

The inventive use of the photosensitizers exhibits a good effectiveness for controlling a number of gram-negative bacteria. Typical examples of gram-negative bacteria which are deactivated quickly and efficiently by irradiation with visible light in the presence of cationic photosensitizers include *Escherichia coli, Pseudomonas aeroginosa* and *Vibrio anguillarum.* On the other hand, such sensitizers can also deactivate gram-positive bacteria such as staphylococci and streptococci. The positive charge necessary for antibacterial activity can be introduced into the macrocycle by way of different substituents.

Preferred substituents for introducing the positive charge into the molecule carry a quaternary ammonium group or a heterocycle comprising a positively charged nitrogen atom.

Especially preferred substituents comprise at least one trialkylammonium group. Furthermore, N-alkyl-pyridinium, N,N-dialkyl-piperazinium or N,N-dialkyl-piperidinium derivatives are preferably used as positively charged substituents. The number of positively charged substituents is preferably in the range of 1 to 4. The positive charge of the macrocycle can be neutralized by anions such as halide ions or tosylate.

Examples of substituents and classes of substituents suitable as carriers of a positive charge in the present invention are illustrated below:

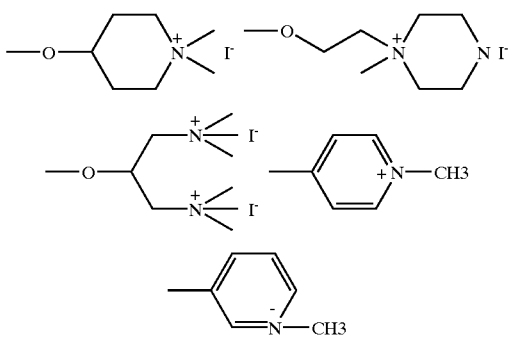

Compounds from the groups of bacteriochlorophylls, chlorins, porphyrins, phthalocyanines and naphthalocyanines, which have been known for a long time and have been described in great detail in the pertinent literature, are preferably used as photosensitizers. A large number of such compounds is commercially available. The person skilled in the art is also familiar with techniques for introducing the substituent(s) carrying the positive charge into the mentioned macrocycles, which are described in detail for example in K. M. Smith, "Porphyrins and Metalloporphyrins", Elsevier Publishing Co. (1975), 29–61.

The skeletal structure of the porphyrins, bacteriochlorophylls, chlorins, phthalocyanines and naphthalocyanines is represented by the following structural formulae:

Porphyrin

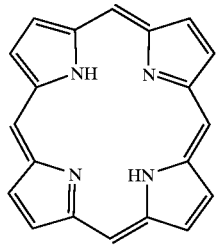

Chlorin

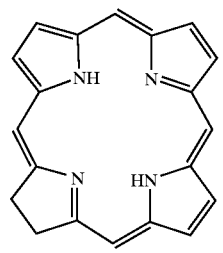

Bacteriochlorophyll

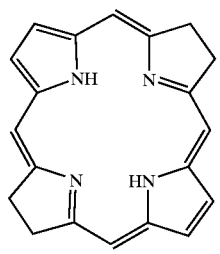

Phthalocyanine

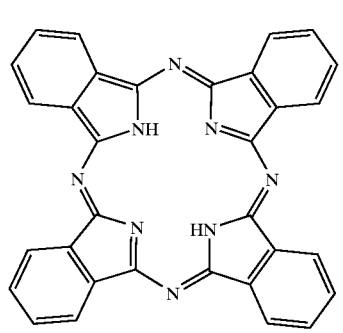

Naphthalocyanine

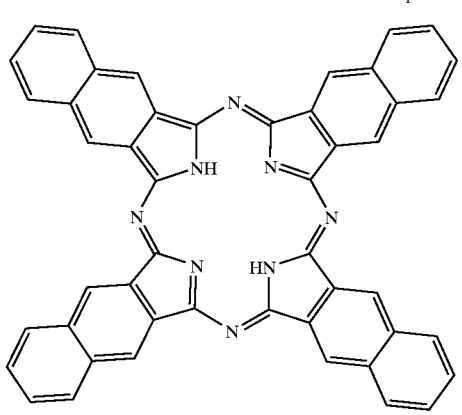

In addition to the charge-carrying groups, the porphyrins, bacteeriochlorophylls, chlorins, phthalocyanines and naphthalocyanines used in the present invention can also carry further substituents.

All of the above-mentioned photosensitizers exhibit an exceptionally good antibacterial effect if they carry at least two positive charges in the molecule, wherein it is particularly advantageous if the two positive charges are present in the meso-positions, thus resulting in an asymmetrical charge distribution in the molecule. However, even a molecule with a single positive charge already exhibits antibacterial activity.

Lipophilic substituents can increase the inhibiting effect of the sensitizers by increasing their affinity to cell membranes. Preferred groups that are able to penetrate cytoplasmic membranes include alkyl chains with 4 to 14, preferably 8 to 12 carbon atoms. Such alkyl groups can advantageously be introduced into the skeletal structure of the sensitizers as substituents at the nitrogen atom of a pyridylium, piperazinylium or piperidinylium substituent.

Bacteriochlorophylls, chlorins, porphyrins, phthalocyanines and naphthalocyanines can bind a large number of different metal ions in the center of the macrocycle, whereby only one ion at a time can be bound. The metal ion is bound to the four nitrogen atoms of the pyrrole rings via coordinate bonds wherein hybrid electron orbitals are involved in the bond.

Important photophysical parameters that determine the sensitizing activity of the mentioned molecules include the quantum efficiency and the life span of the lowest excited triplet state as well as the quantum efficiency of the singlet oxygen formation. This data can be inferred from tabular compilations for many photosensitizers, however, it can also be determined by the person skilled in the art himself. For instance, the first parameter can be determined by means of laser flash photolysis and diffusive reflectance. These measurements allow the selection of a photosensitizer whose excited state has a life span long enough to allow the reaction with oxygen in the basic state. The efficiency of the oxygen conversion to $^1O_2$ is established by determining the luminescence emission of $^1O_2$ in the near infrared spectrum using a nitrogen-cooled Ge-detector. Moreover, for determining the selectivity of the $^1O_2$ formation, it is possible to determine the reaction constant of the reaction between photosensitizer and oxygen compared to the reaction constant with other substrates (e.g. unsaturated lipids, steroids, aromatic or sulfurous amino acids). Photosensitizers that exclusively form $^1O_2$ are especially preferred for use in the inventive process.

The singlet oxygen ($^1O_2$) formed by the irradiation of the photosensitizers is generated by the electronic excitation of normal oxygen and has a life span of a few microseconds in water equilibrated with air. It is able to diffuse a distance of about 15 mm before it is deactivated, and due to its high degree of reactivity has a deactivating effect on microorganisms.

In order to maintain water quality, the photosensitizers can be added directly to the aquarium water at a concentration of between 1 and 30 $\mu$mol/l, preferably between 5 and 15 $\mu$mol/l. If this concentration range is observed, any toxic effect of the molecules on the aquarium fauna and flora can be ruled out. Surprisingly, the health of the fish is not compromised by the chemicals.

Despite their low decomposition rate in aqueous solutions, the photosensitizers have to be added at regular intervals in order to maintain the effective concentration in the aquarium. For this purpose it is e.g. possible, due to the favorable stability of the used molecules in aqueous solution, to prepare concentrates depending on the size of the aquarium which can be administered by the user without further efforts. Furthermore, the delayed release of the sensitizers incorporated into the carrier material is also a suitable parameter when selecting a suitable water-soluble carrier material for use in aquaria. Due to their strong tendency to form complexes, the sensitizers are easily adsorbed by different materials such as for example ion exchangers, sand, zeolites, activated carbon, but also peat, and therefore their concentration is continuously decreased by the use of conventional filter systems for the removal of particulate impurities. Thus, this way an accumulation of the sensitizer and thus a potential harm to the fish can be ruled out.

In a particularly preferred embodiment, several photosensitizers are used simultaneously in the treatment of the water. It is particularly advantageous if the different photosensitizers are selected such that the spectrum of the light sources used for illumination of the aquarium can be used for photosensitization. Compounds with different absorption maximums can be selected; for example one compound with an absorption maximum at about 400 nm, one compound with an absorption maximum at about 500 nm and another compound with an absorption maximum at about 600 nm. Such a combination of photosensitizers with different absorption maximums has the advantage that the light can be used especially efficiently.

Furthermore it is possible to immobilize photosensitizers and to introduce them into the aquarium as part of a solid matrix. Water-insoluble polymers which form a covalent bond with the sensitizer molecules are particularly preferred as carriers. This way, a polymer-based carrier can for example be provided which comprises the photosensitizer in an amount suitable for the size and contents of the aquarium. In the inventive use, it is directly introduced into the aquarium.

Examples of compounds suitable for the present invention include the following:

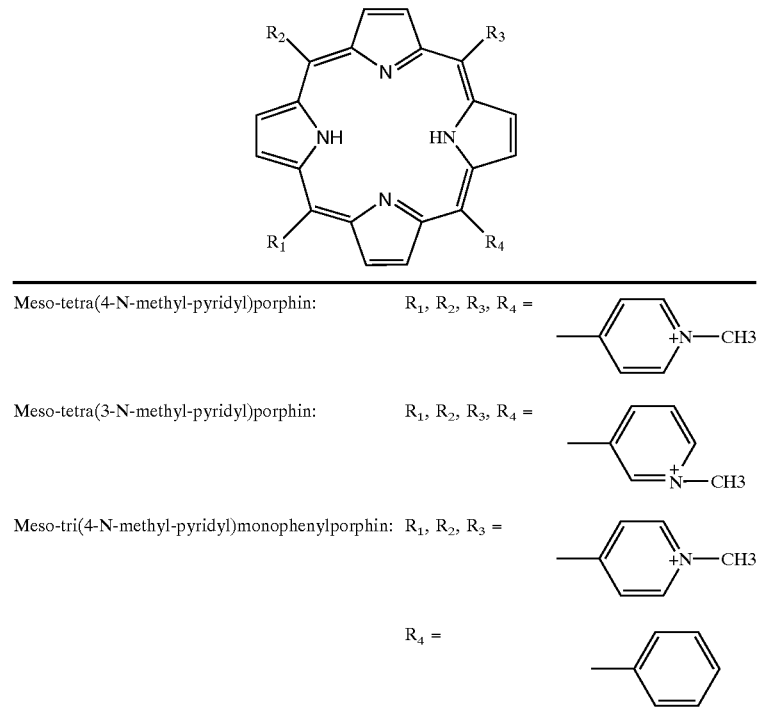

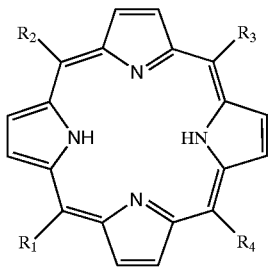

Meso-di(N-methyl-4-pyridyl)diphenylporphin:  $R_1, R_2 =$  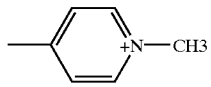

$R_3, R_4 =$ 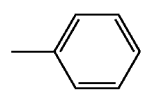

Meso-mono(N-methyl-4-pyridyl)triphenylporphin  $R_1 =$ 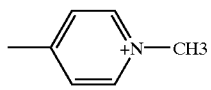

$R_2, R_3, R_4 =$ 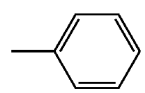

As further compounds of the porphyrin type in addition to meso-tetra(N-4-methyl-pyridyl)porphin (abbreviated as $T_4MPyP$), compounds can be used wherein the length of the alkyl group bound to the nitrogen atom of the pyridylium group has been increased to up to 12 carbon atoms, such as for example meso-tetra(N-4-ethyl-pyridyl)porphin ($T_4EPyP$), meso-tetra(N-3-ethyl-pyridyl)porphin ($T_3EPyP$) or meso-tetra(N-4-pentyl-pyridyl)porphin ($T_4PPyP$).

An example of compounds having two positive charges in the meso-position is cis-di-(N-methyl-pyridyl)-diphenyl-diphenyl-porphin.

What is claimed is:

1. A method for controlling bacterial germs and algae in aquarium water, comprising
   (a) Adding to the aquarium water without first removing fish or plants from the aquarium an effective anti-algae and anti-bacterial amount of at least one photosensitizer compound of the tetrapyrrol or tetraazopyrrol families having at least one positive charge at a substituent; and
   (b) Subjecting the photosensitizer to electromagnetic radiation.

2. The method of claim 1 wherein the photosensitizer is selected from the group consisting of bacteriochlorophylls, chlorins, porphyrins, phthalocyanines, and naphthalocyanines.

3. The method of claim 1, wherein the photosensitizer comprises a porphyrin skeleton.

4. The method of claim 1, wherein the photosensitizer carries 2 to 4 positive charges.

5. The method of claim 1, wherein the photosensitizer carries 2 positive charges in the meso-position.

6. The method of claim 1, wherein the photo sensitizer carries at least one lipophilic substituent.

7. The method of claim 6, wherein the lipophilic substituent comprises an alkyl group having 4 to 14 carbon atoms.

8. The method of claim 1, wherein the photosensitizer is present in a concentration of from about 1 to about 30 $\mu$mol/l.

9. The method of claim 1, wherein the photosensitizer is a blend of photosensitizers having different absorption maximums of light spectra, and the electromagnetic radiation is a visible light of entire visible spectrum.

10. The method of claim 1, wherein the substituent comprises a quaternary ammonium group or a heterocycle having a positively charged nitrogen.

11. The method of claim 10, wherein the substituent comprises at least one trialkylammonium group.

12. The method of claim 10, wherein the substituent is selected from a group consisting of N-alkyl-pyridinium, N,N-dialkyl-piperazinium and N,N-dialkyl-piperidinium derivatives.

13. The method of claim 1, wherein the electromagnetic radiation is a visible light.

14. The method of claim 13, wherein the light has a spectrum in the range of about 350 to about 900 nm.

15. The method of claim 7, wherein the alkyl group of the lipophilic substituent has 8 to 12 carbon atoms.

16. The method of claim 7, therein the alkyl group of the lipophilic substituent is attached to the substituent having said at least one positive charge.

* * * * *

UNITED STATES PATENT AND TRADEMARK OFFICE
CERTIFICATE OF CORRECTION

PATENT NO. : 6,716,794 B2
DATED : April 6, 2004
INVENTOR(S) : Schaffer et al.

It is certified that error appears in the above-identified patent and that said Letters Patent is hereby corrected as shown below:

Column 7,
Line 55 and 56, "...of bacteriochiorophylls, chlorins,..." should be -- ...of bacteriochlorophylls, chlorines,... --

Column 8,
Line 33, "... the photo sensitizer..." should be -- ...the photosensitizer... --
Line 59, "...therein the alkyl group..." should be -- ...wherein the alkyl group ... --

Signed and Sealed this

Twenty-eighth Day of September, 2004

JON W. DUDAS
*Director of the United States Patent and Trademark Office*